United States Patent
Gallo et al.

(10) Patent No.: US 9,459,423 B2
(45) Date of Patent: Oct. 4, 2016

(54) FIRE RESISTANT OPTICAL COMMUNICATION CABLE USING CERAMIC-FORMING FIBERS

(71) Applicant: Corning Cable Systems LLC, Hickory, NC (US)

(72) Inventors: Emanuela Gallo, Berlin (DE); William Carl Hurley, Hickory, NC (US); Christopher Mark Quinn, Hickory, NC (US); Waldemar Stöcklein, Coburg (DE)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 90 days.

(21) Appl. No.: 14/077,616

(22) Filed: Nov. 12, 2013

(65) Prior Publication Data

US 2015/0131952 A1 May 14, 2015

(51) Int. Cl.
*G02B 6/44* (2006.01)
(52) U.S. Cl.
CPC .................. *G02B 6/4436* (2013.01)
(58) Field of Classification Search
None
See application file for complete search history.

(56) References Cited

U.S. PATENT DOCUMENTS

| 5,183,079 A * | 2/1993 | Blin .............................. 138/110 |
| 5,388,175 A | 2/1995 | Clarke .......................... 385/100 |
| 5,433,991 A * | 7/1995 | Boyd et al. .................... 428/193 |
| 6,998,536 B2 | 2/2006 | Barusseau et al. ....... 174/110 R |
| 7,340,134 B1 | 3/2008 | Hudson, II et al. |
| 9,006,355 B1 * | 4/2015 | Fish .............................. 525/477 |
| 2003/0178220 A1 * | 9/2003 | Barusseau et al. ..... 174/110 PM |
| 2007/0207186 A1 * | 9/2007 | Scanlon et al. ............... 424/424 |
| 2008/0063875 A1 * | 3/2008 | Robinson et al. ............ 428/426 |
| 2009/0238964 A1 | 9/2009 | Keller et al. ................... 427/177 |
| 2011/0013581 A1 | 1/2011 | Lee et al. |
| 2011/0135816 A1 | 6/2011 | Burns et al. |
| 2011/0243515 A1 | 10/2011 | Bradley et al. |
| 2013/0029151 A1 | 1/2013 | Madeleine et al. ........... 428/395 |
| 2013/0051745 A1 | 2/2013 | Weimann ...................... 385/112 |

(Continued)

FOREIGN PATENT DOCUMENTS

| CN | 201757799 U | 3/2011 | |
| EP | 0249375 A2 | 12/1987 | ............... D06P 3/24 |
| EP | 0600651 A1 | 6/1994 | |

(Continued)

OTHER PUBLICATIONS

Patent Cooperation Treaty, International Search Report for PCT/US2014/063780, Mail date Jan. 28, 2015, 6 pages.

(Continued)

*Primary Examiner* — Andrew Jordan
(74) *Attorney, Agent, or Firm* — William D. Doyle (57) ABSTRACT

A fire resistant optical communication cable is provided. The fire-resistant optical communication cable includes an extruded cable body including an inner surface defining a passage in the cable body and an outer surface. The fire-resistant optical communication cable includes a plurality of elongate optical transmission elements located within the passage of the cable body. The fire-resistant optical communication cable includes a layer of intumescent particles embedded in the material of the cable body forming an intumescent layer within the cable body. The cable may include one or more elements having flame resistant coatings that, upon exposure to heat, form a ceramic layer increasing the combustion time of the coated element.

16 Claims, 3 Drawing Sheets

(56) References Cited

U.S. PATENT DOCUMENTS

2014/0179831 A1* 6/2014 Pinnavaia et al. ............ 523/451
2014/0235767 A1* 8/2014 Hatanaka et al. ............ 524/100

FOREIGN PATENT DOCUMENTS

| EP | 1491678 B1 | 3/2009 | .......... D06M 15/643 |
| WO | 0246288 A2 | 6/2002 | |
| WO | 2012032370 A1 | 3/2012 | |

OTHER PUBLICATIONS

Beyer; ""Nanocomposites—A New Class of Flame Retardants""; Oct. 1, 2002 (Oct. 1, 2002), XP055161517,Retrieved from the Internet:URL:http://jpkc.wjxy.edu.cnirsx/zy/Nanocomposites a new class of flame retardants for polymers.pdf'.

* cited by examiner

FIRE RESISTANT OPTICAL COMMUNICATION CABLE USING CERAMIC-FORMING FIBERS

BACKGROUND

The disclosure relates generally to communication cables and more particularly to optical communication cables including fire resistant materials. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to a fire-resistant optical communication cable. The fire-resistant optical communication cable includes an extruded cable body including an inner surface defining a passage in the cable body and an outer surface. The fire-resistant optical communication cable includes a plurality of elongate optical transmission elements located within the passage of the cable body. The fire-resistant optical communication cable includes a layer of intumescent particles embedded in the material of the cable body forming an intumescent layer within the cable body. The intumescent layer extends radially from the inner surface of the cable body at least a portion of the distance from the inner surface to the outer surface of the cable body such that the intumescent layer surrounds the plurality of elongate optical transmission elements. The intumescent layer is located between the plurality of elongate optical transmission elements and the outer surface of the cable body, and the intumescent particles expand and form char upon exposure to fire.

An additional embodiment of the disclosure relates to an optical communication cable. The optical communication cable includes a cable body including an inner surface defining a passage in the cable body and an outer surface. The optical communication cable includes a plurality of optical transmission elements located within the passage. The optical communication cable includes a layer of intumescent particles embedded in the material of the cable body forming an intumescent layer within the cable body extending radially from the inner surface of the cable body at least a portion of the distance from the inner surface to the outer surface of the cable body such that the intumescent layer surrounds the plurality of optical transmission elements. The intumescent layer is located between the plurality of optical transmission elements and the outer surface of the cable body. The optical communication cable includes an elongate fiber located within the passage of the cable body, and the elongate fiber includes an outer flame resistant coating. Upon exposure to heat, the flame resistant coating forms a ceramic layer increasing the combustion time of the elongate fiber.

An additional embodiment of the disclosure relates to an optical communication cable. The optical communication cable includes a cable body including an inner surface defining a passage in the cable body and an outer surface. The optical communication cable includes a plurality of optical transmission elements located within the passage. The optical communication cable includes an elongate element including an outer surface and located within the cable body. The optical communication cable includes a flame resistant coating bound to the outer surface of the elongate element. The flame resistant coating includes a first layer of siloxane polymer adjacent the outer surface of the elongate element and a first layer of a clay compound bound to the first layer of siloxane polymer.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) are shown. In general, the cable embodiments disclosed herein include one or more fire resistant or fire retardant materials configured to insulate optical fibers within the cable from heat and generally to resist burning and/or fire propagation along the length of the cable. In various embodiments, one or more fire retardant materials (e.g., intumescent materials) are positioned adjacent the inner passage of the cable and are configured to expand upon exposure to heat in a manner that blocks or limits air flow through the central passage of the cable body. In addition, various components of the cable may be coated with a layer of fire resistant materials that forms a ceramic coating upon exposure to heat providing a heat insulating layer that slows heat propagation and slows oxygen reaching the coated component, and thereby increases the combustion time of the coated component.

In various embodiments, the fire resistant cables discussed herein include multiple flame resistant materials located at different radial positions within the cable. In such embodiments, as heat, for example from fire, is transferred from the outer surface of the fiber optic cable, each of the different fire resistant components is triggered slowing heat transfer. In one such embodiment, the cable jacket may include a non-intumescent fire resistant material, for example metal hydroxide material such as aluminum hydroxide, located within the outer portions of the cable jacket. In such embodiments, the cable jacket includes particles of intumescent material embedded in the material of the cable jacket forming an intumescent layer that coats the inner surface of the cable jacket and is exposed to the inner passage defined by the cable jacket. In this embodiment, as heat is transferred through the cable jacket, the intumescent material expands within the central passage of the cable body blocking or limiting air flow. The intumescent material also forms a char layer that has low heat conductivity further limiting heat penetration into the middle of the cable.

As will be understood, a number of different elongate members are typically found within the central passage of a fiber optic cable (e.g., strength wires/rods, strength yarns, water blocking yarns, buffer tubes, tight buffered optical fibers, etc.). In various embodiments, such elongate members have an outer fire resistant coating that upon exposure to heat forms a ceramic layer increasing the combustion time of the elongate fiber and further limiting heat penetration through the cable. Thus, in various embodiments, the multiple flame resistant features of the cable embodiments discussed herein provide a cable with multi-stage fire or burn resistant properties.

Figure 1:
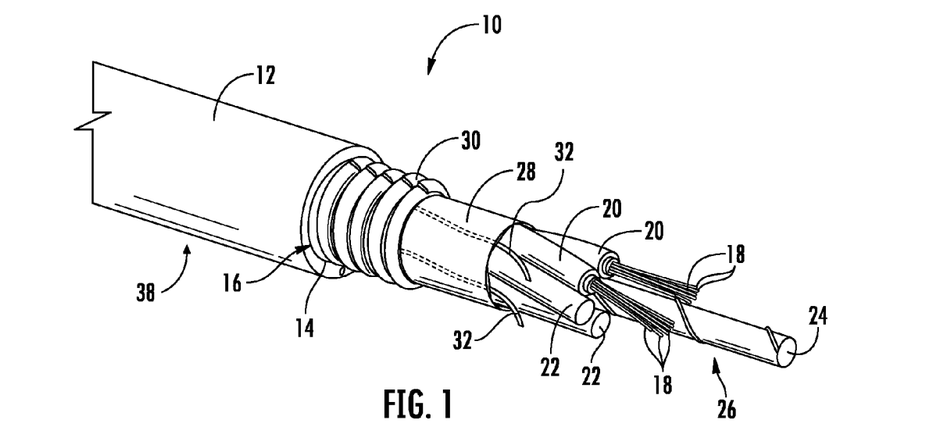
FIG. 1 is a perspective view of an optical fiber cable according to an exemplary embodiment.

Referring to FIG. 1, an optical communication cable, shown as cable 10, is shown according to an exemplary embodiment. Cable 10 includes a cable body, shown as cable jacket 12, having an inner surface 14 that defines an inner passage or cavity, shown as central bore 16. As will be generally understood, inner surface 14 of cable jacket 12 defines an internal area or region within which the various cable components discussed below are located. A plurality of optical transmission elements, shown as optical fibers 18, are located within bore 16. Generally, cable 10 provides structure and protection to optical fibers 18 during and after installation (e.g., protection during handling, protection from the elements, protection from vermin, etc.).

In the embodiment shown in FIG. 1, cable 10 includes a plurality of core elements located within central bore 16. A first type of core element is an optical transmission core element, and these core elements include bundles of optical fibers 18 that are located within tubes, such as buffer tubes 20. One or more additional core elements, shown as filler rods 22, may also be located within bore 16. Filler rods 22 and buffer tubes 20 are arranged around a central support, shown as central strength member 24 formed from a material such as glass-reinforced plastic or metal (e.g., steel). Together, buffer tubes 20 containing optical fibers 18, filler rods 22 and central strength member 24 form the core 26 of cable 10.

Cable 10 may include a layer, shown as layer 28, located outside of and surrounding the elements of core 26. In one embodiment, layer 28 may be one or more helically wrapped binders. In another embodiment, layer 28 may be a water blocking tape. In another embodiment, layer 28 may be a fire retardant tape such as mica tape.

In some embodiments, cable 10 includes a reinforcement sheet or layer, shown as armor layer 30, that is located outside of layer 28. Armor layer 30 is wrapped around the interior elements (including optical fibers 18) of cable 10 such that armor layer 30 surrounds optical fibers 18. Armor layer 30 generally provides an additional layer of protection to fibers 18 within cable 10, and may provide resistance against damage (e.g., damage caused by contact or compression during installation, damage from the elements, damage from rodents, etc.).

Cable 10 may also include one or more additional elongate elements, shown as yarn fibers 32, located within central bore 16. In one embodiment, yarn fibers 32 may be a tensile strength fiber, such as an aramid yarn fiber. In some embodiments, yarn fibers 32 may be a yarn fiber formed from a polymer material, such as aramid or polyester, that may be a water block yarn that includes super absorbent polymer particles bound to the yarn. As discussed in more detail below, yarn fibers 32 are coated with a fire-resistant pre-ceramic material that limits heat transfer and oxygen within cable 10 upon exposure to heat.

Figure 2:
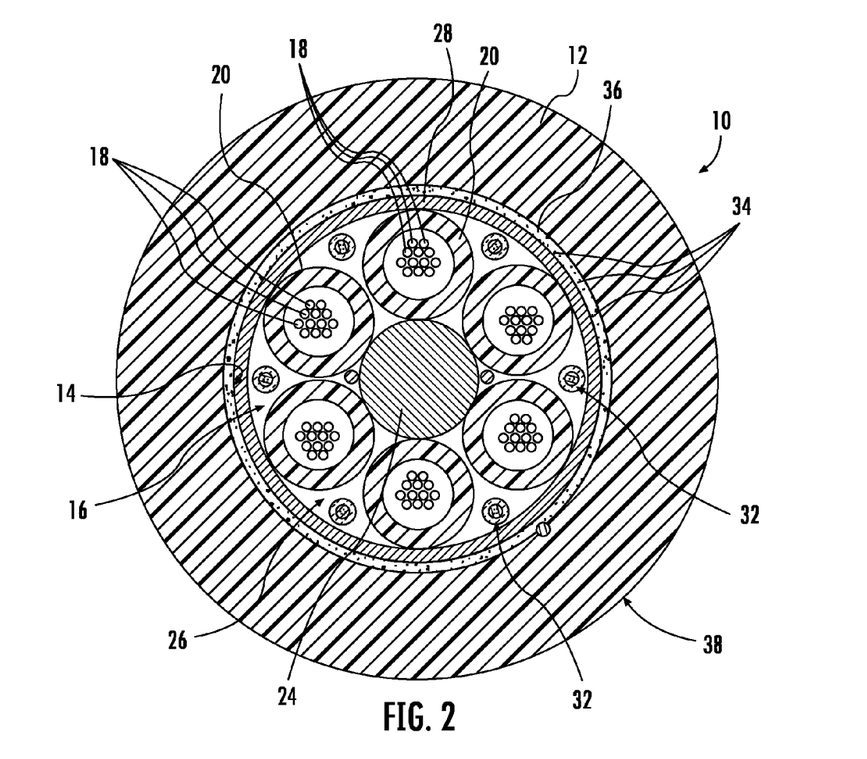
FIG. 2 is an axial cross-sectional view of an optical fiber cable according to an exemplary embodiment.

Referring to FIG. 2, an axial cross-section of a cable 10 is shown according to another exemplary embodiment. In the embodiment of FIG. 2, cable 10 is shown without armor layer 30. In various embodiments, cable 10 includes a plurality of particles 34 of an intumescent material embedded within the material of cable jacket 12. In such embodiments, particles 34 are embedded within the material of cable jacket 12 extending from inner surface 14 in the radial direction forming an intumescent layer 36 having a thickness or depth in the radial direction.

Intumescent particles 34 are formed from one or more intumescent materials that expands and forms char upon exposure to heat. The expansion of the intumescent material provides fire resistance by blocking air flow through cable jacket 12 and through central bore 16. In various embodiments, intumescent particles 34 are configured to expand in volume more than 500 times in the presence of fire, and in other embodiments are configured to expand in volume more than 1000 times in the presence of fire. In addition, the char formation provides a layer material with low heat transfer characteristics. In various embodiments, intumescent particles 34 may include intumescent materials that form light char and/or include intumescent materials that form hard char. In various embodiments, intumescent particles 34 include sodium silicates and/or graphite. In various embodiments, the intumescent material of particles 34 include one or more of the Exolit materials commercially available from Clariant, such as Exolit AP 765 (TP) material, intumescent powders manufactured by CeaseFire, intumescent powders manufactured by Zhejiang Longyou Sihai Chemical Industry Co., Ltd., Qingdao Sungraf Chemical Industry Co., Ltd., Dalian CR Science Development Co., Ltd., Weifang Menjie Chemicals Co., Ltd., or other manufacturers.

According to an exemplary embodiment, the intumescent material adjoins and/or extends from an inner surface of the jacket, such as including particles that are partially embedded in the surface and include portions thereof that extend therefrom. In some embodiments, the inner-most layer extending from the inside of the jacket consists substantially of intumescent and binder material. In some embodiments, the jacket may be viewed as a composite structure, having a polymeric outer layer of polyvinyl chloride or other flame-retardant polymer, and having an inner layer formed mostly from intumescent material. In some embodiments, adhesives hold a layer of the intumescent material to the inner surface. According to an exemplary embodiment, in a fire or extreme heat, the intumescent material expands inward to fill interstitial and other free space within the core of the cable. Fill the space chokes off passageways through the core of the cable that may otherwise allow super-heated air and/or smoke to travel through the core. Applicants believe that when the intumescent material adjoins and/or extends from the inner surface of the jacket, the intumescent material is less constrained that similar such material that is fully embedded in the jacket, and therefore the intumescent material more quickly and/or more fully chokes off the passageways through the core.

Figure 3:
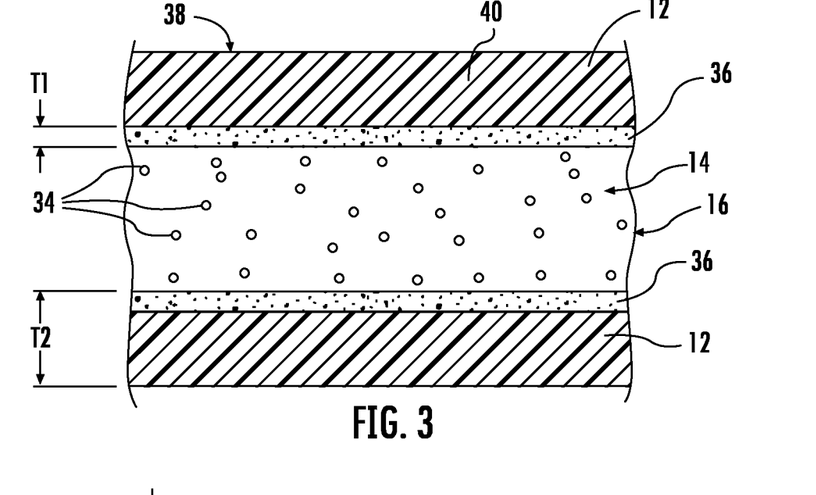
FIG. 3 is a side cross-sectional view of an optical fiber cable according to an exemplary embodiment.

Referring to FIG. 3, a sectional side view of inner surface 14 of cable jacket 12 with the core elements removed is shown according to an exemplary embodiment. As shown in FIG. 3, intumescent particles 34 are embedded in the material of cable jacket 12 along inner surface 14. In this configuration, at least some of the intumescent particles 34 are only partially surrounded by the material of cable jacket 12 such that the outer surfaces of some of the intumescent particles 34 are exposed to central bore 16 of cable jacket 12.

With intumescent layer 36 located at the inner surface 14 of cable jacket 12, intumescent particles 34 are positioned such that upon expansion during a fire, the intumescent material tends to limit air flow through central bore 16. In addition, the positioning of intumescent particles 34 allows the formation of a char layer in the event of fire that surrounds the elements of core 26 slowing heat transfer to optical fibers 18. Further, with intumescent layer 36 located around elements of core 26, when intumescent particles 34 expand in the presence of fire, core 26 is held together, and in particular, the strands of fire resistant yarn 32 are maintained in position between optical fibers 18 and intumescent layer 36. This arrangement allows fire resistant yarn 32 to remain as an additional fire protective layer between optical fibers 18 and the exterior of cable 10 even following activation and expansion of intumescent layer 36.

In various embodiments, intumescent particles 34 are embedded in the material of cable jacket 12 during the extrusion of cable jacket 12 while the material of cable jacket 12 is hot and viscous. In this embodiment, intumescent particles 34 become embedded and suspended in the material of cable jacket 12 as the material of cable jacket 12 solidifies. In such embodiments, because intumescent particles 34 are embedded in the material of cable jacket 12, intumescent layer 36 remains in place around the core elements of cable 10 regardless of the handling during installation or the orientation after installation of cable 10. Thus, in such embodiments and in contrast to location of intumescent powder unfixed within bore 16, intumescent layer 36 maintains the fire protective layer circumferentially around fibers 18 and axially along the length of central bore 16.

In one such embodiment, an intumescent powder including intumescent particles 34 is injected into bore 16 as cable jacket 12 is extruded. A blower or vacuum propels intumescent particles 34 into inner surface 14 of cable jacket 12 while the material of cable jacket 12 is still viscous, causing intumescent particles 34 to become embedded in the material of cable jacket 12 along inner surface 14 as shown in FIG. 3. In one embodiment, intumescent particles 34 are injected via an injection system such as is described in US Published Patent Application No. US2011/0135816, which is incorporated herein by reference in its entirety.

In contrast to flame resistant materials that may be mixed with the material of cable jacket 12 prior to extrusion, intumescent particles 34 are embedded in inner surface 14 forming intumescent layer 36 that extends part of the radial distance from inner surface 14 toward outer surface 38 of cable jacket 12. In various embodiments, the density of intumescent particles 34 within the material of cable jacket 12 decreases as the radial distance from central bore 16 increases.

Referring to FIG. 3, in various embodiments, intumescent layer 36 has a radial dimension or thickness, shown as T1, and in various embodiments, cable jacket 12 has a radial dimension or thickness, shown as T2. In the embodiment shown T1 is less than T2 such that intumescent layer does not extend all of the way through cable jacket 12. In various embodiments, intumescent layer 36 is one particle thick, and in such embodiments, T1 is the same as the diameter (e.g., the average diameter) of the particles of intumescent layer 36.

In various embodiments, the amount of intumescent material for a particular cable may be determined by calculating the volume within bore 16 that is to be filled when the intumescent material is activated and expands. The volume of bore 16 to be filled in a meter of cable is divided by the expansion ratio of the intumescent material and is multiplied by the density of the intumescent material. For example, to fill a volume of 15 cubic centimeters per meter of cable length utilizing an intumescent material having a density of 2.0 g/cc and that expands by a factor of 500 times when heated, the cable would need about 144 mg of intumescent per meter of cable. Large cables such as a 432-fiber ribbon cable may have free central bore volumes of about 83 cc/m that is to be filled upon expansion of the intumescent material, and small cables such as a 12-fiber loose tube cable may have free central bore volumes of about 1.95 cc/m that is to be filled upon expansion of the intumescent material. In various embodiments, a particular cable may include 1.5 to 4 times, and specifically 2 to 3 times, the minimum amount of intumescent material per meter of cable length as determined above to ensure sufficient material is embedded in the material of the cable jacket to provide the desired fire protection. In various embodiments, the amount to intumescent material placed in a cable may range from 20 mg/m of cable length to 330 mg/m of cable length. In another embodiment, the amount of intumescent material may be more than 330 mg/m of cable length.

In various embodiments, cable jacket 12 does not include fire resistant materials compounded with the material of cable jacket 12 outside of intumescent layer 36. However, in other embodiments, in addition to intumescent layer 36 located along inner surface 14 of cable jacket 12, cable 10 may also include non-intumescent fire resistant materials located in portions of cable jacket 12, such as outer portion 40 located radially exterior to intumescent layer 36. In one embodiment, outer portion 40 extends from the outer most perimeter of intumescent layer 36 to outer surface 38 of cable 10. In other embodiments, outer fire resistant portion 40 may be located anywhere radially exterior to intumescent layer 36. In various embodiments, fire resistant portion 40 includes a non-intumescent fire resistant material, such as a metal hydroxide, aluminum hydroxide, magnesium hydroxide, etc., that produces water in the presence of heat/fire which slows or limits heat transfer through cable body 12. In such embodiments, first resistant outer portion 40 provides an exterior most layer of fire resistant and intumescent layer 36 provides a fire resistant layer between outer portion 40 and bore 16.

In some embodiments in which intumescent layer 36 is combined with a fire resistant material for cable jacket 12, lower amounts of non-intumescent fire resistant materials are included within the material of cable jacket 12 because of the extra fire resistances provided by intumescent layer 36. In such embodiments, a highly-filled jacket material with a limiting oxygen index (LOI) of 54 might be replaced with a less highly-filled jacket material with an LOI of 48 or less while still providing sufficient fire resistance. In such embodiments, the lower amounts of non-intumescent fire resistant materials may improve physical performance (e.g., flexibility, strength, etc.) of cable jacket 12 while remaining compliant with applicant standards and codes for fire resistance. In some embodiments, the use of the intumescent layer may eliminate the need for fire retardant tapes, such as mica tapes while still providing sufficient fire resistance.

Figure 4:
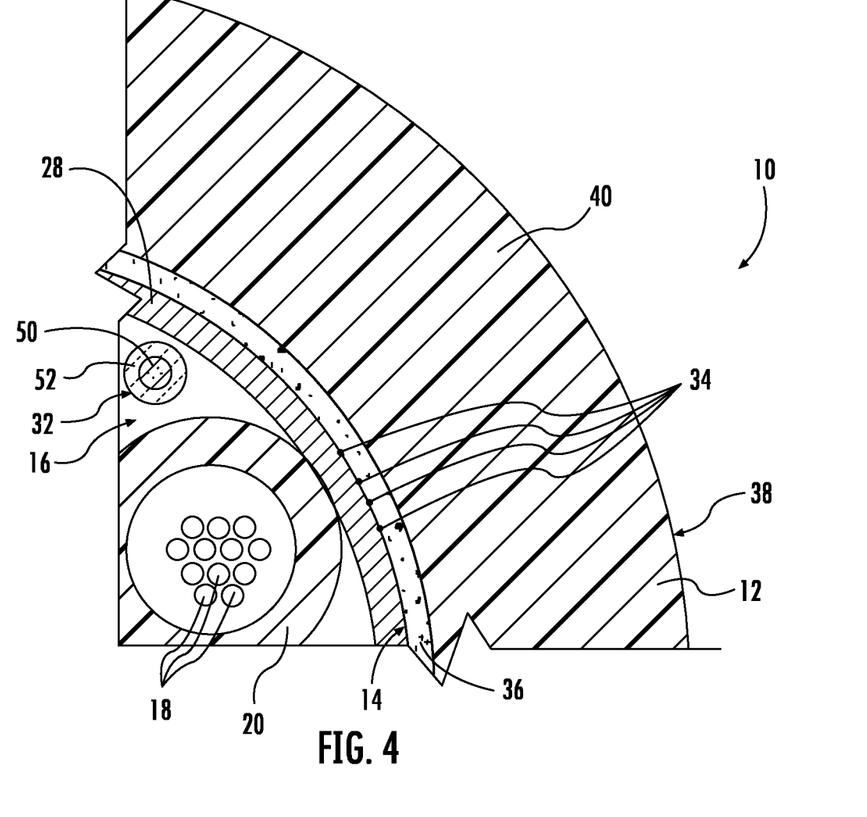
FIG. 4 is a detailed axial cross-sectional view of a portion of an optical fiber cable according to an exemplary embodiment.

Referring to FIG. 4, cable 10 includes one or more yarn fibers 32. Yarn fibers 32 include an elongate central fiber strand 50 and a flame resistant outer coating 52. In various embodiments, fiber strand 50 is a tensile strength fiber material, and in a specific embodiment is an aramid fiber. In various embodiments, flame resistant outer coating 52 is formed from a material configured to form a ceramic layer upon exposure to heat which increases the combustion time of the yarn fiber 32. In various embodiments, outer coating 52 includes one or more alternating layers of a polymer material and a clay compound. In such embodiments, upon exposure to heat or flame, outer coating 52 undergoes re-organization and cross-linking forming a ceramic layer.

In various embodiments, outer coating 52 is a halogen-free fire resistant coating. In some such embodiments, the polymer layer is a cationic polymer material and the clay compound is an anionic material and the layers are held together via electrostatic interaction. In various embodiments, outer coating 52 includes two or more layers of polymer material and two or more alternating layers of the clay compound. In specific embodiments, outer coating 52 includes five or more layers of polymer material and five or more alternating layers of clay compound. In various embodiments, a first layer of polymer is adjacent to and bound to the outer surface of fiber strand 50, and a layer of clay compound is exterior to the first layer of polymer. In multilayer embodiments of outer coating 52, a second layer of polymer is bound to the exterior of the first layer of clay compound, and a second layer of clay compound is bound to the exterior of the second layer of polymer. In various embodiments, this pattern repeats forming the desired number of alternating layers of polymer and clay compound.

In specific embodiments, the polymer material is a siloxane polymer material. In various embodiments, the clay compound includes aluminosilicate components. In some embodiments, the clay compound includes montmorillonite (MMT). In such embodiments, the MMT structure includes two fused tetrahedral layers of silica sandwiching an octahedral layer of alumina and magnesia. In various embodiments, the MMT compound may also include iron, lithium, rhodium and/or cesium components. In various embodiments, the clay compound is a synthetic clay compound, and in other embodiments, the clay compound is a naturally occurring clay compound. In various embodiments, the clay compound has an average particle size between 0.1 micrometers and 50 micrometers. In one embodiment, the clay compound of outer coating 52 is between 0.1% and 2% by weight of outer coating 52, and more specifically is between 0.1% and 2% by weight of outer coating 52.

While FIG. 4 shows outer coating 52 applied to a fiber strand 50, outer coating 52 may be applied to any component of cable 10 to provide flame resistance. In various embodiments, outer coating 52 is applied to the outer surface of buffer tubes 20. In other embodiments, outer coating 52 is applied to the outer surface of central strength member 24. In other embodiments, outer coating 52 may be applied to layer 28, to polyester fibers, to filler rods 22, to ripcords, etc. located within cable 10.

Figure 5:
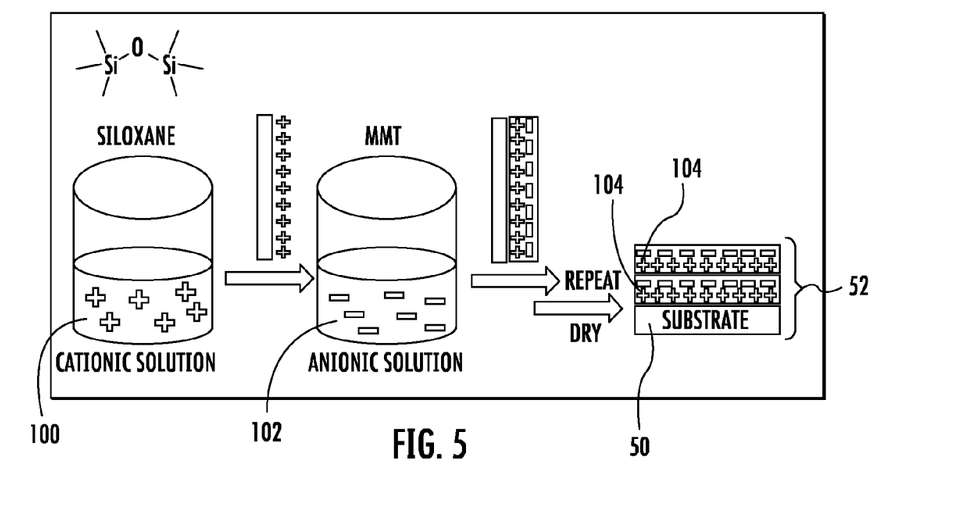
FIG. 5 is a diagram showing formation of a flame resistant coating according to an exemplary embodiment.

Referring to FIG. 5, a process of forming outer coating 52 is shown according to an exemplary embodiment. In this embodiment, the cable component to be coated with outer coating 52 is alternately dipped between a cationic solution of siloxane polymer 100 and an anionic solution of MMT 102. Each application of the cationic siloxane and anionic MMT forms a bilayer 104. The alternate application of cationic siloxane and anionic MMT is repeated as desired to form the desired number of bilayers. Following application of cationic siloxane and anionic MMT, the coated yarn fiber 32 is dried to complete formation of outer coating 52. In other embodiments, cationic siloxane and anionic MMT forms may be applied via other mechanisms other than dipping such as alternating spray application.

In various embodiments, the cationic solution of siloxane polymer 100 and the anionic solution of MMT 102 are formed from an appropriate organic polar solvent such as alcohol, water and water and alcohol mixtures. In one embodiment, the cationic solution of siloxane polymer 100 is prepared by adding between 0.1-1 weight % of siloxane powder to ethanol. The pH is adjusted to pH 5 using 1 M hydrochloric acid. In one embodiment, the siloxane solution 100 is magnetically stirred for 1 hour at 50 degrees Celsius to completely dissolve the siloxane powder. In various embodiments, the siloxane powder may be based on dimethyl, methylvinyl siloxane, dimethylvinyl-terminated and layer aluminosilicates. In various embodiments, the anionic solution of MMT 102 is prepared by adding between 0.1-1 weight % of MMT to deionized water at 18.2 M Ohm and stirred for 1 hour at 80 degrees C. The pH of the anionic solution of MMT 102 is adjusted to pH 6 with 1 M NaOH or 1 M HCL.

To prepare the coated fiber, each fiber is alternately dipped in the siloxane and MMT solutions discussed above. In one embodiment, each fiber was maintained in each solution for 5 minutes for the first application of each solution. Following the initial application, each fiber was maintained in each solution for 1 minute for each additional application. After the deposition of the desired number of bilayers, the coated fiber is dried at 80 degrees Celsius for 2 hours. In another embodiment, the coated fibers are dried in an oven at 200 degrees Celsius for 10 minutes.

Whether or not the above-described, specially-treated yarns are used, the intumescent material works synergistically with aramid yarns, fiberglass yarns, or other strength yarns to protect the core of the cable from combustion. Applicants believe that, when thermally activated in fire or super-heated air, the intumescent material, positioned along the interior of the inside of the jacket, expands inward to fill the interstitial spaces within the core of the cable. In doing so, the intumescent material surrounds and compresses the strength yarns around the core, forming a tightly packed fire-resistant layer of the strength yarns. Fire and heat must penetrate the tightly packed layer of strength yarns before reaching the more-flammable optical fibers, fiber-optic ribbons, etc., which may be coated in acrylate. Applicants believe that tightly packing the strength yarns prevents the heat of the fire from reaching the full surface are of the strength yarns, reducing the area of exposure and thereby reducing the rate at which the compressed materials may be penetrated. This synergistic packing effect of the intumescent material may be particularly effective when the yarns are coated, as described herein, and form the ceramic barrier.

In various embodiments, cable jacket 12 may be a variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), etc. In various embodiments, fiber strand 50 is an aramid yarn formed from aramid (polyamide) fibers. In other embodiments, fiber strand 50 may be formed from other yarn or fiber materials including other polyamides, liquid crystal polymer (e.g., Vectran), high tenacity polyester, polypropylene, etc. In various embodiments, buffer tubes 20 are formed from one or more polymer material including polypropylene, polycarbonate, polybutylene terephthalate (PBT), polyamide (PA), polyoxymethylene (POM), polyvinylchloride (PVC), flame retardant PCV, poly(ethene-co-tetrafluoroethene) (ETFE), combination of the polymer materials discussed herein, etc.

In various embodiments, the cable embodiments discussed herein may include one or more electrical conductive elements located within bore 16. In various embodiments, the conductive element may be a copper conductive element having a diameter of 12 AWG, 14 AWG, 16 AWG, 18 AWG, 20 AWG, 22 AWG, 24 AWG, or smaller.

While the specific cable embodiments discussed herein and shown in the figures relate primarily to cables and core elements that have a substantially circular cross-sectional shape defining substantially cylindrical internal bores, in other embodiments, the cables and core elements discussed herein may have any number of cross-section shapes. For example, in various embodiments, cable jacket 12 and/or buffer tubes 20 may have an oval, elliptical, square, rectangular, triangular or other cross-sectional shape. In such embodiments, the passage or lumen of the cable or buffer tube may be the same shape or different shape than the shape of cable jacket 12 or buffer tube 20. In some embodiments, cable jacket 12 and/or buffer tube 20 may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. While the embodiments discussed herein relate primarily to optical communication cables, in various other embodiments, the fire-protection embodiments discussed above may be utilized in copper communication cables and/or power cables.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A fire-resistant optical communication cable comprising:
    an elongate cable body including an inner surface defining a passage in the elongate cable body and an outer surface;
    a plurality of elongate optical transmission elements located within the passage of the elongate cable body; and
    a layer of intumescent particles bonded to and at least partially embedded in material of the elongate cable body, the layer of intumescent particles at least partially defining the inner surface of the elongate cable body and extending radially from the inner surface of the elongate cable body at least a portion of the distance from the inner surface to the outer surface of the elongate cable body such that the layer of intumescent particles surrounds the plurality of elongate optical transmission elements and is located between the plurality of elongate optical transmission elements and the outer surface of the elongate cable body, wherein intumescent particles of the layer of intumescent particles expand and form char upon exposure to fire, filling interstitial spaces within the passage thereby at least partially choking off flow of smoke and superheated gases through the passage; and
    an elongate fiber located within the passage of the elongate cable body, the elongate fiber including an outer flame resistant coating, wherein upon exposure to heat the flame resistant coating forms a ceramic layer increasing the combustion time of the elongate fiber.

2. The fire-resistant optical communication cable of claim 1 wherein the flame resistant coating comprises:
    a first layer of siloxane polymer adjacent an outer surface of the elongate fiber; and
    a first layer of a clay compound bound to an exterior of the first layer of siloxane polymer;
    a second layer of siloxane polymer bound to an exterior of the first layer of the clay compound; and
    a second layer of the clay compound bound to the exterior of the second layer of siloxane polymer.

3. The fire-resistant optical communication cable of claim 2 wherein the elongate fiber comprises aramid.

4. The fire-resistant optical communication cable of claim 2 further comprising an outer layer of non-intumescent fire retardant material located within the material of the elongate cable body, the outer layer of non-intumescent fire retardant material extending inward from the outer surface of the elongate cable body.

5. The fire-resistant optical communication cable of claim 4 wherein the non-intumescent fire retardant material comprises at least one of aluminum hydroxide and magnesium hydroxide and is free of intumescent particles.

6. An optical communication cable comprising:
    a cable body including an inner surface defining a passage in the cable body and an outer surface;
    a plurality of optical transmission elements located within the passage;

a layer of intumescent particles embedded in the material of the cable body forming an intumescent layer within the cable body extending radially from the inner surface of the cable body at least a portion of the distance from the inner surface to the outer surface of the cable body such that the intumescent layer surrounds the plurality of optical transmission elements and is located between the plurality of optical transmission elements and the outer surface of the cable body; and an elongate fiber located within the passage of the cable body, the elongate fiber including an outer flame resistant coating, wherein upon exposure to heat the flame resistant coating forms a ceramic layer increasing the combustion time of the elongate fiber.

7. The optical communication cable of claim 6 wherein the flame resistant coating comprises;
   a first layer of siloxane polymer adjacent an outer surface of the elongate fiber; and
   a first layer of a clay compound located exterior to the first layer of siloxane polymer;
   a second layer of siloxane polymer located exterior to the first layer of the clay compound; and
   a second layer of the clay compound located exterior to the second layer of siloxane polymer.

8. The optical communication cable of claim 7 wherein at least some of the intumescent particles are partially surrounded by the material of the cable body such that outer surfaces of the at least some of the intumescent particles are exposed to the passage of the cable body.

9. The optical communication cable of claim 8 wherein the amount of intumescent particles within the intumescent layer comprises between 20 mg of intumescent particles per meter length of cable to 330 mg of intumescent particles per meter length of cable.

10. The optical communication cable of claim 7 further comprising a layer of non-intumescent fire retardant material located within the material of the cable body, the layer of non-intumescent fire retardant material extending inward from the outer surface of the cable body.

11. The optical communication cable of claim 10 wherein non-intumescent fire retardant material comprises at least one of aluminum hydroxide and magnesium hydroxide.

12. An optical communication cable comprising:
   a cable body including an inner surface defining a passage in the cable body and an outer surface;
   a plurality of optical transmission elements located within the passage; and
   an elongate element including an outer surface located within the cable body;
   a flame resistant coating bound to the outer surface of the elongate element, the flame resistant coating comprising:
   a first layer of siloxane polymer adjacent the outer surface of the elongate element; and
   a first layer of a clay compound bound to the first layer of siloxane polymer.

13. The optical communication cable of claim 12 wherein the elongate element comprise at least one of an aramid yarn fiber, a polyester fiber, a ripcord, a glass-reinforced plastic rod and buffer tube.

14. The optical communication cable of claim 12 wherein the flame resistant coating includes more than two layers of siloxane polymer and more than two layers of clay compound, wherein a layer of clay compound is located between each adjacent layer of siloxane polymer.

15. The optical communication cable of claim 12 wherein the clay compound comprises montmorillonite.

16. The optical communication cable of claim 12 further comprising a layer of intumescent particles embedded in the material of the cable body forming an intumescent layer within the cable body extending radially from the inner surface of the cable body at least a portion of the distance from the inner surface to the outer surface of the cable body such that the intumescent layer surrounds the plurality of optical transmission elements and is located between the plurality of optical transmission elements and the outer surface of the cable body, wherein the intumescent particles expand and form char upon exposure to fire.

* * * * *